(12) United States Patent
Peterson

(10) Patent No.: US 9,754,511 B2
(45) Date of Patent: Sep. 5, 2017

(54) DEVICES AND METHODS FOR HANDS-ON LEARNING OF MATHEMATICAL CONCEPTS

(71) Applicant: MIND Research Institute, Irvine, CA (US)

(72) Inventor: Matthew R. Peterson, Irvine, CA (US)

(73) Assignee: MIND RESEARCH INSTITUTE, Irvine, CA (US)

( * ) Notice: Subject to any disclaimer, the term of this patent is extended or adjusted under 35 U.S.C. 154(b) by 511 days.

(21) Appl. No.: 14/536,139

(22) Filed: Nov. 7, 2014

(65) Prior Publication Data
US 2016/0133156 A1 May 12, 2016

(51) Int. Cl.
*G09B 23/04* (2006.01)
*G09B 23/02* (2006.01)

(52) U.S. Cl.
CPC ............. *G09B 23/02* (2013.01); *G09B 23/04* (2013.01)

(58) Field of Classification Search
USPC ....... 434/188, 195, 196, 202, 205, 209, 211, 434/213–216
See application file for complete search history.

(56) References Cited

U.S. PATENT DOCUMENTS

| | | | | |
|---|---|---|---|---|
| 5,370,538 A | * | 12/1994 | Sidray | G09B 23/04 434/188 |
| 5,421,732 A | * | 6/1995 | Taylor | A63F 3/0415 434/195 |
| 5,816,822 A | * | 10/1998 | Safavi | G09B 23/02 273/144 R |
| 6,132,217 A | * | 10/2000 | Dickson | G09B 23/04 434/211 |
| 6,213,779 B1 | * | 4/2001 | Campbell | G09B 23/04 33/27.01 |
| 6,609,712 B1 | * | 8/2003 | Baumgartner | G09B 1/34 273/276 |
| 7,632,099 B2 | * | 12/2009 | Wilson | G09B 1/02 434/187 |
| 7,942,675 B1 | * | 5/2011 | Errthum | G09B 19/02 434/211 |
| 2008/0108030 A1 | * | 5/2008 | Bayne | G09B 19/02 434/188 |
| 2010/0216101 A1 | * | 8/2010 | Chung | G09B 19/02 434/188 |

\* cited by examiner

*Primary Examiner* — Kurt Fernstrom
(74) *Attorney, Agent, or Firm* — Klein, O'Neill & Singh, LLP

(57) ABSTRACT

Devices and methods for hands-on learning of mathematical parabolic concepts are provided. For example, a device for teaching mathematics includes a base having a plurality of channels for accepting vertical rods of varying lengths; a lever movably attached to the base at a pivot, the lever passing through the plurality of channels; and a plurality of vertical rods, each of the plurality of vertical rods located at least partially in one of the plurality of channels and resting on the lever; wherein the plurality of vertical rods are sized and arranged so that the tops of the vertical rods illustrate a parabolic function; and wherein moving the lever about the pivot moves the plurality of rods within the plurality of channels and illustrates changes to the parabolic function represented by the vertical rods.

18 Claims, 10 Drawing Sheets

DEVICES AND METHODS FOR HANDS-ON LEARNING OF MATHEMATICAL CONCEPTS

BACKGROUND

Technical Field

This disclosure is related to the field of physical teaching models and in particular to physical models for mathematical concepts.

Related Art

Principles of algebra can often be somewhat challenging to visualize and comprehend for students. Many students (or users, used interchangeably throughout this specification) have difficulty understanding equations and their graphical representation, especially quadratic polynomials such as parabolic equations.

Often teachers rely on coordinate grids (on graphing paper or chalkboards or dry-erase boards) to illustrate the geometric characteristics of parabolas. However, such drawings are by their nature static, and teachers cannot easily provide a visual understanding of how changes to the coefficients of the polynomial equation changes the shape of the parabola without drawing multiple graphs. This can be difficult for students to follow. Continuous efforts are being made to improve teaching techniques and devices to aid students.

SUMMARY

Teaching aids for manipulating and visualizing parabolas are disclosed herein. Providing a physical model that can be manipulated by a teacher or student can help a student visualize how the values of coefficients in a parabolic equation can change the features of the parabola.

In one aspect, a device for teaching mathematics includes a base having a plurality of channels for accepting vertical rods of varying lengths; a lever movably attached to the base at a pivot, the lever passing through the plurality of channels; and a plurality of vertical rods, each of the plurality of vertical rods located at least partially in one of the plurality of channels and resting on the lever; wherein the plurality of vertical rods are sized and arranged so that the tops of the vertical rods illustrate a parabolic function; and wherein moving the lever about the pivot moves the plurality of rods within the plurality of channels and illustrates changes to the parabolic function represented by the vertical rods. In a further aspect, moving the lever about the pivot illustrates changes to a coefficient b from the standard parabolic equation. Another aspect further includes a coordinate grid indicator attached to the base to provide a reference point for the parabolic function formed by the plurality of rods.

In another aspect, a method for teaching and/or learning concepts of parabolas includes: obtaining a base having a plurality of channels to support vertical bars sitting on a rotatable platform; positioning vertical bars in the plurality of channels on the rotatable platform such that the vertical bars are sized to resemble a parabola; rotating the rotatable platform to observe changes to the parabola of the vertical bars, where the rotation indicates changes to a coefficient b in a standard parabolic equation, $y=ax^2+bx+c$. In a further aspect, the method includes, when the rotatable platform can be raised or lowered within the base, raising or lowering the rotatable platform to observe changes to the coefficient c in the standard parabolic equation.

In another aspect, a device for teaching mathematics includes a base having a plurality of channels for accepting vertical rods; a rotatable platform movably attached to the base at a pivot, the platform passing through the plurality of channels for supporting vertical rods; and a plurality of vertical rods, each of the plurality of vertical rods located at least partially in one of the plurality of channels and resting on the rotatable platform; wherein the plurality of vertical rods are marked and arranged so that the markings of the vertical rods illustrate at least one parabolic function; and wherein rotating the platform about the pivot moves the plurality of rods within the plurality of channels and illustrates changes to the at least one parabolic function represented by the vertical rods.

BRIEF DESCRIPTION OF THE DRAWINGS

These and other features and advantages of the present device, systems, and methods will become appreciated as the same become better understood with reference to the specification, claims and appended drawings wherein like reference numerals reflect like elements as illustrated in the following figures:

DETAILED DESCRIPTION

The use of physical devices that can be manipulated (manipulatives) as a means of teaching mathematical concepts relies on a constructivist educational paradigm, which can build upon a student's physical intuitions and broaden understanding of more abstract ideas. As such, a device for modeling parabolas is provided according to an aspect of the disclosure.

A parabola is generally represented in one of two equation forms. The first is the "standard form," i.e. $y=ax^2+bx+c$, where x and y are the variables and a, b, and c are coefficients for a given equation. The second is the "vertex form," i.e. $y=a(x-h)^2+k$, again with x and y as variables and a, h, and k are coefficients for a given equation. The vertex form is so called, because the coordinates (h, k) describe the vertex of the parabola resulting from the equation on a standard Cartesian (x, y) coordinate graph.

In general a teaching aid is provided that can be manipulated to show the relationships between parabola shapes and alignment on a standard Cartesian (x, y) coordinate graph when the equation coefficient values are changed. In the standard form of the equation, a parabola has an axis of symmetry that is defined by the line, $x=-b/2a$. Varying the magnitude of a changes the overall width of the parabola, about the axis of symmetry. Compared to a parabola with $|a|=1$, any parabola with $|a|<1$ will have a broader shape and a flatter curve at the vertex because the value of y for each coordinate pair on the graph will be reduced by a factor equal to the a coefficient. Similarly, for any parabola with $|a|>1$, the parabola will have a narrower shape and a more pointed curve at the vertex. The value of a cannot be zero without losing the parabolic shape and leaving a straight line; positive values of a produce a parabola that opens upward, and negative values of a produce a parabola that opens downward. Additionally, as indicated, changing h and k alter the location of the parabola's vertex.

Figure 1:
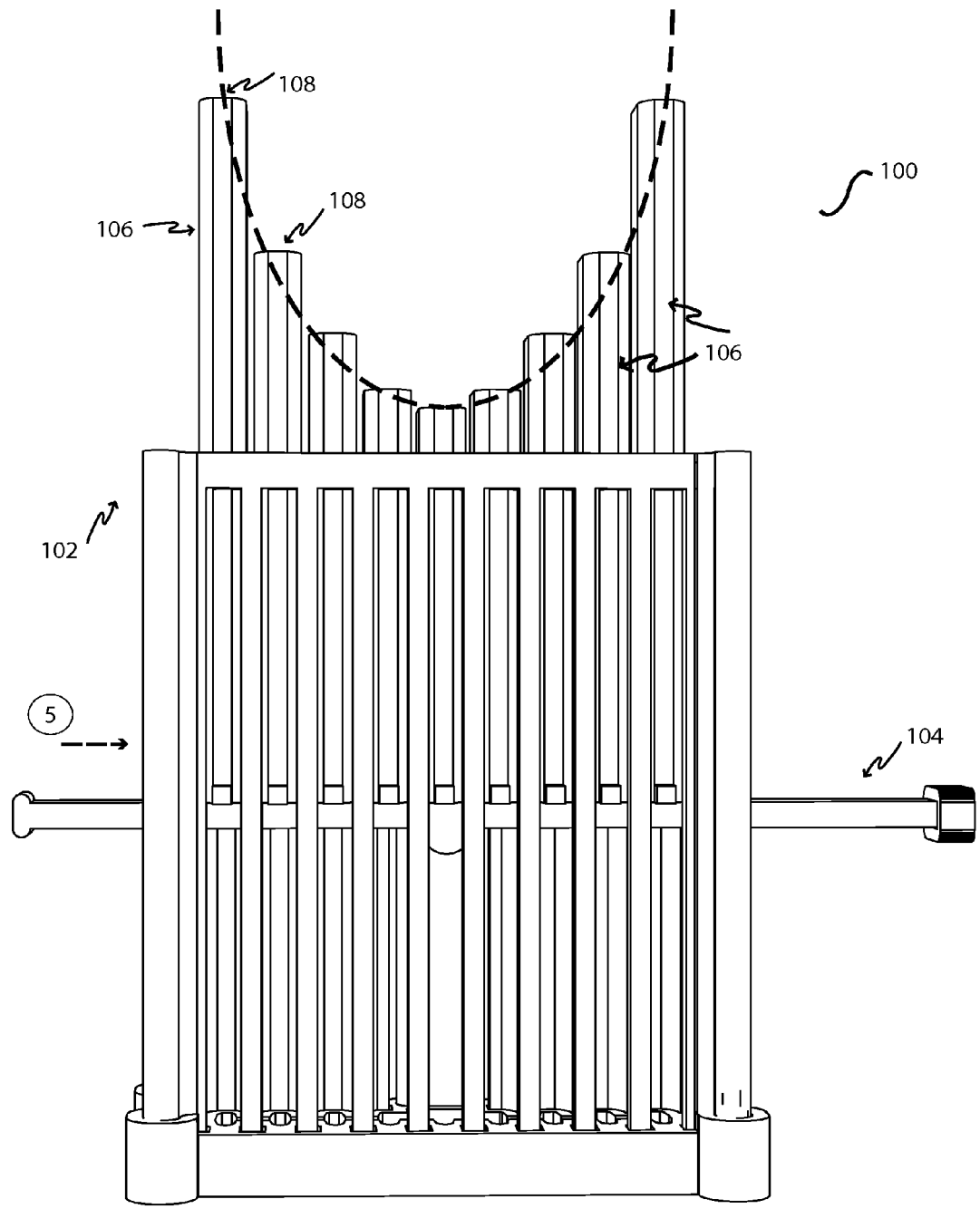
FIG. 1 illustrates a front view of an example parabolic teaching aid in accordance with an embodiment of the present disclosure.

FIG. 1 illustrates a front view of a parabolic teaching aid 100 in accordance with an embodiment of the present disclosure. The teaching aid includes a base 102 with a movable lever 104 and a plurality of vertical bars 106 of varying heights that can be placed to resemble a parabolic curve. As illustrated in FIG. 1, there are nine vertical bars 106 whose top end points 108 can generally indicate points along a virtual parabola (illustrated by the dotted line 105). The number and spacing of the vertical bars may be altered in various aspects to include more or less than those pictured. The figures represent an example embodiment only. In an aspect, each vertical bar 106 rests on or otherwise can be moved by lever 104. Level 104, in an aspect, can be raised and lowered with respect to a pivot point 312 (see FIG. 3). Throughout the figures, dashed arrows with circled numbers indicate the perspective of other figures—where the numbers indicate the figures. The discussion herein may refer to a standard (x, y) coordinate system, where the y-axis is a vertical axis and the x-axis is a horizontal axis; with respect to the teaching aid 100, the x-axis—in some aspects—may be considered the horizontal line represented by the top of base 102. It should be noted that these axes may be illustrated, such as on the base, or imaginary and need not be fixed with respect to any one aspect of the teaching aid 100.

Figure 2:
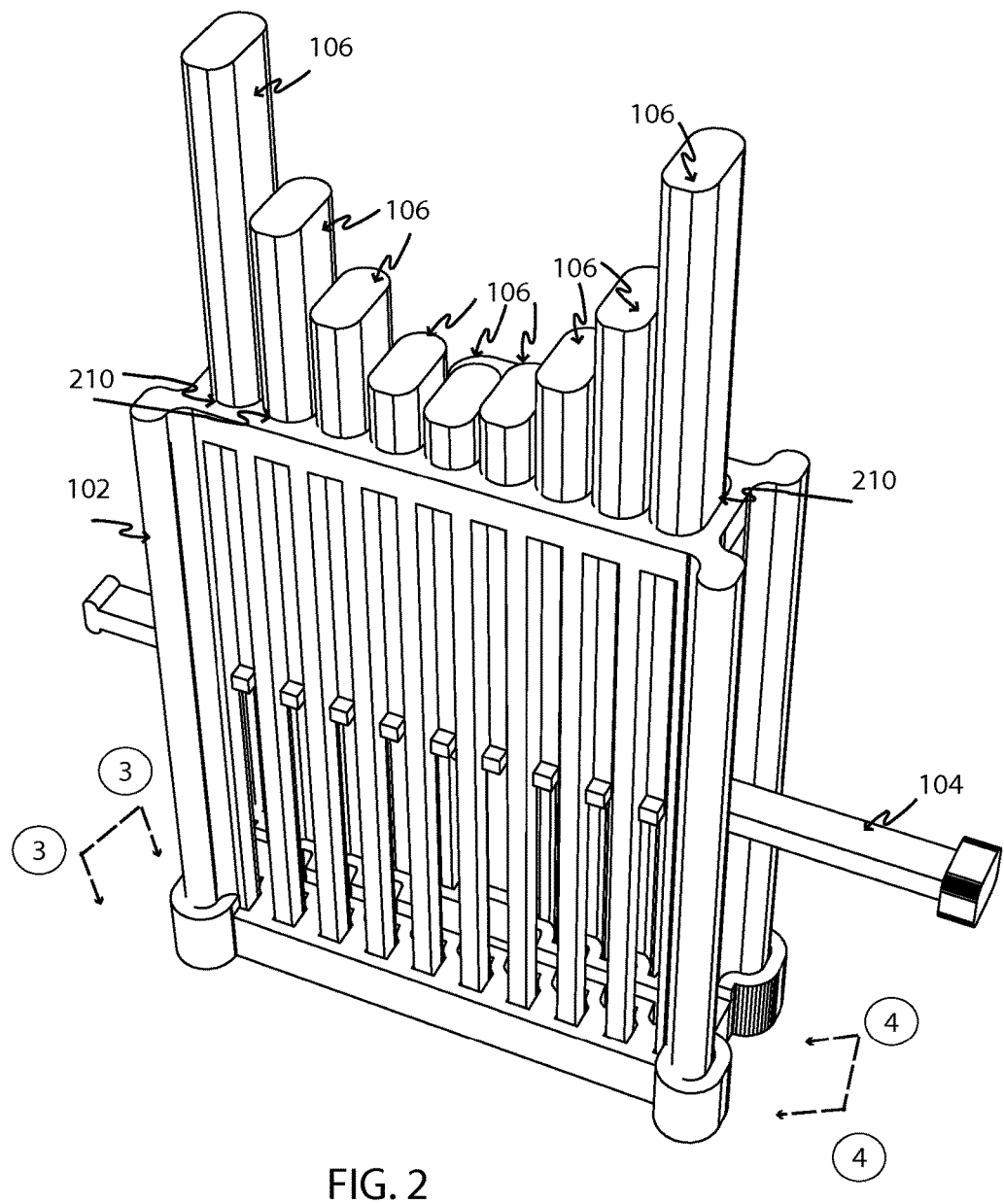
FIG. 2 illustrates a front perspective view of the parabolic teaching aid of FIG. 1 in accordance with an embodiment of the present disclosure.
Figure 3:
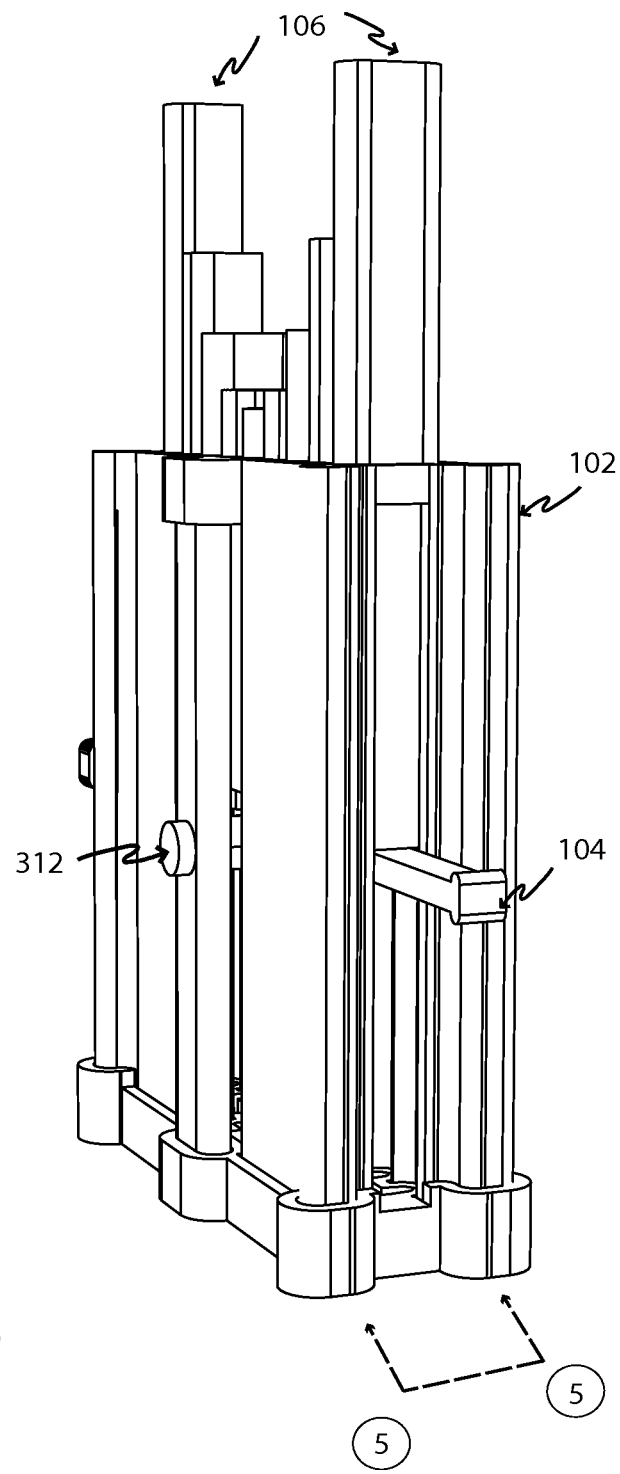
FIG. 3 illustrates a side perspective view of the parabolic teaching aid of FIG. 1 in accordance with an embodiment of the present disclosure.

FIG. 2 illustrates a front perspective view of the parabolic teaching aid of FIG. 1 in accordance with an embodiment of the present disclosure. From this view, a plurality of channels 210 can be seen having holes at the top of base 102, each of these channels being capable of accepting one of the plurality of vertical bars 106. FIG. 3 illustrates a side perspective view of the parabolic teaching aid of FIG. 1 in accordance with an embodiment of the present disclosure, which also shows a portion of the back. Pivot point 312 can be seen from this angle. The pivot 312 may include a pin, a nail, a screw, a bolt, or other fastening mechanism which will allow lever 104 to rotate about the pivot 312.

Figure 4:
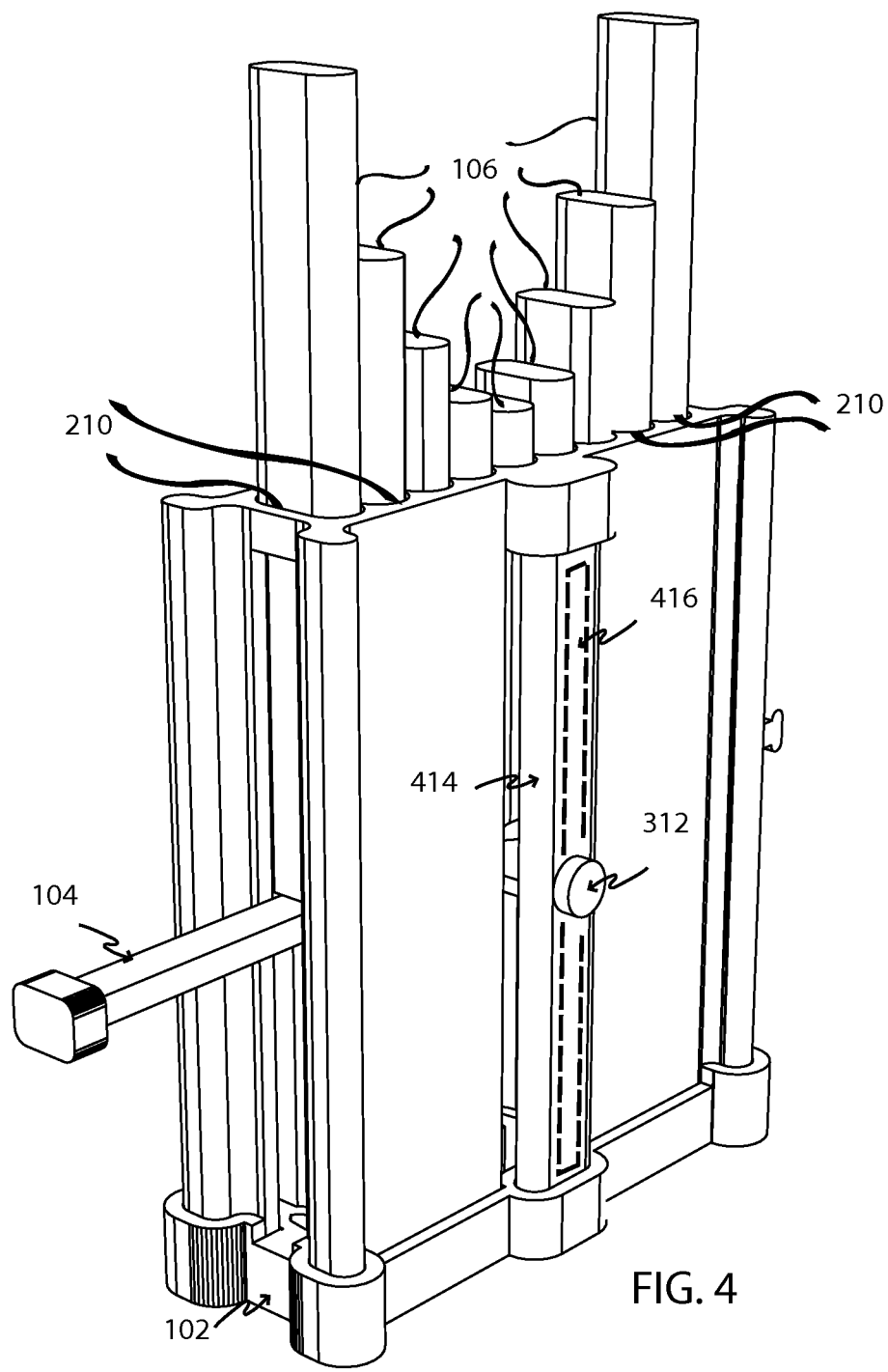
FIG. 4 illustrates a rear perspective view of the parabolic teaching aid of FIG. 1 in accordance with an embodiment of the present disclosure.

FIG. 4 illustrates a more rear perspective view of the parabolic teaching aid of FIG. 1 in accordance with an embodiment of the present disclosure. From this perspective a vertical riser 414 is visible through which pivot 312 connects to lever 104. Optionally, in an aspect, the vertical riser 414 may include a channel 416 which would allow the pivot to be raised and lowered with respect to the base 102. Movement of this pivot point up or down, without changing any other feature of the manipulative, would illustrate a change in the value of k in the vertex equation of a parabola or a change in the value of c in the standard equation. It serves to raise or lower the vertex in parallel with the y-axis (or more precisely along the parabola's axis of symmetry).

Figure 5:
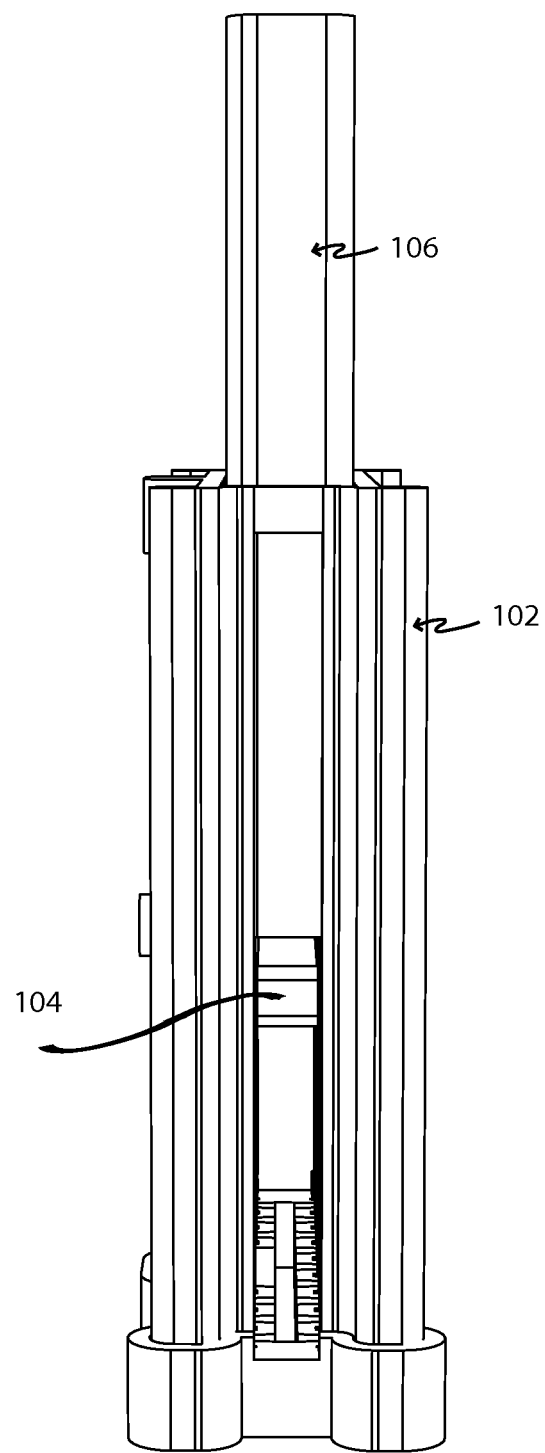
FIG. 5 illustrates a side view of the parabolic teaching aid of FIG. 1 in accordance with an embodiment of the present disclosure.
Figure 6:
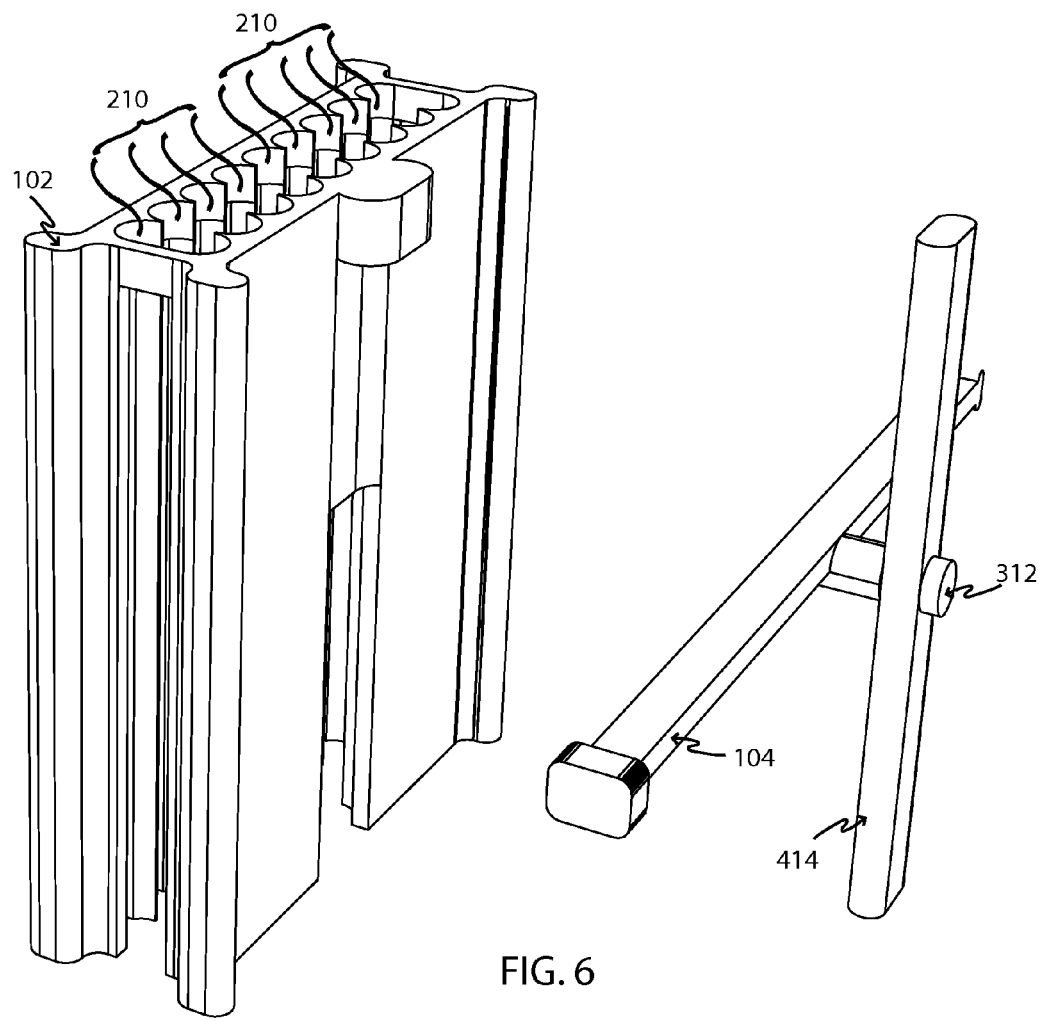
FIG. 6 illustrates a bottom exploded view of aspects of the parabolic teaching aid of FIG. 1 in accordance with an embodiment of the present disclosure.

FIG. 5 illustrates a side view of the parabolic teaching aid of FIG. 1 in accordance with an embodiment of the present disclosure. FIG. 6 illustrates a bottom exploded view of aspects of the parabolic teaching aid of FIG. 1 in accordance with an embodiment of the present disclosure. Channels 210 for accepting the vertical bars 106 are seen in base 102. As can be seen in this figure, channels 210 may be generally connected but are shaped to accept the vertical bars 106 (not pictured). In other aspects, each channel may be fully separate, some channels may be open to each other, or there may be combinations of the same or the like. An example of the lever assembly is also illustrated with the lever 104 attached to pivot 312 and vertical riser 414. As illustrated here, the lever is angularly movable about pivot 312. In an aspect, pivot 312 may include sufficient rotational resistance with lever 104 that the lever remains in place when not acted on by a user. In another aspect, the lever may be more freely movable.

Figure 7:
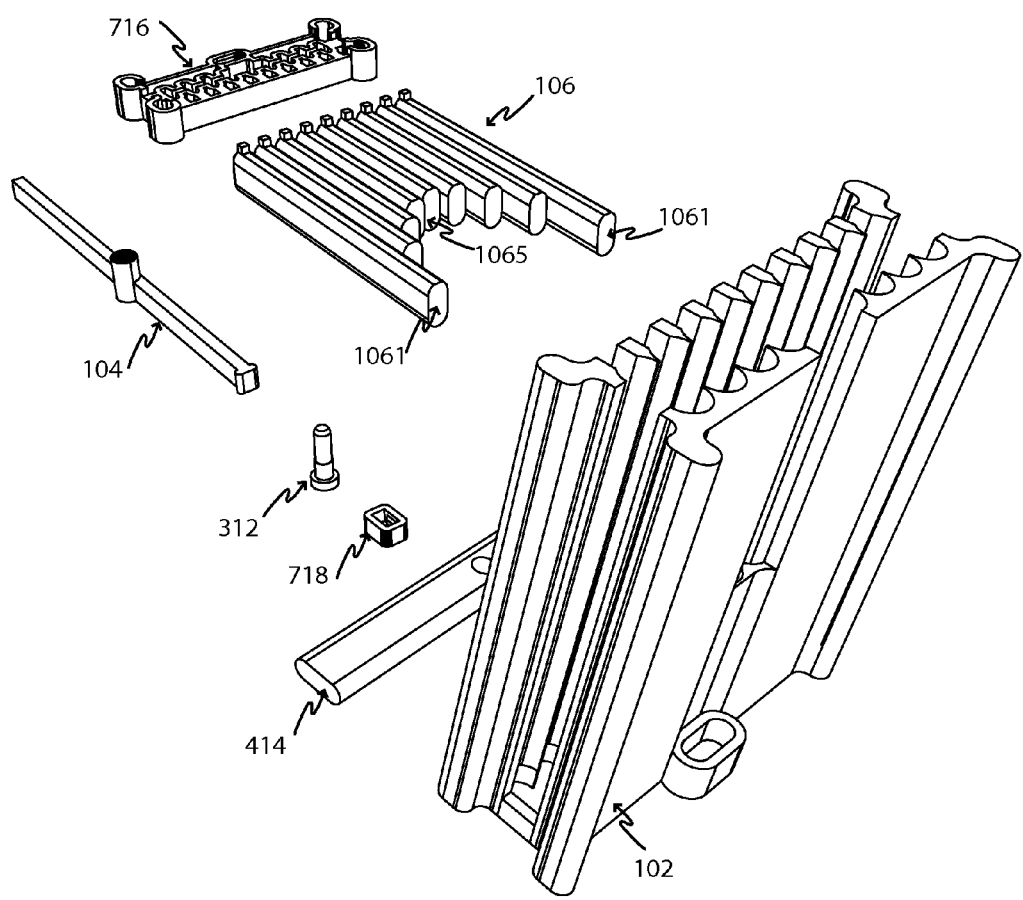
FIG. 7 illustrates an exploded component view of the parabolic teaching aid of FIG. 1 in accordance with an embodiment of the present disclosure.

FIG. 7 illustrates another exploded view with all of the components of the parabolic teaching aid of FIG. 1. Illustrated are base 102, lever 104, a plurality of vertical bars 106 (including at least one short bar 106s and one or two long bars 106l), pivot 312, vertical riser 414, a base cap 716, and a lever handle 718. It should be noted that base cap 716 may alternatively be a top cap 716, as the teaching aid as illustrated can be assembled in a variety of manners and still accomplish the purposes as disclosed herein.

In an aspect, each component may be made of plastic and formed by, for example, injection molding, machining, or 3D printing technology. Other generally rigid materials may also be used for some or all of the components illustrated, including glass, wood, metal, and the like. In an aspect, vertical rods 106 are provided in pairs of varied lengths so as to mirror a parabola as illustrated. In some aspects, an odd number of vertical bars 106 may include one unpaired vertical bar, such as a short bar 106s. In order to simulate an open down parabola (one with a negative a value in the standard form equation, $y=ax^2+bx+c$), an extra short bar 106s may be included and one long bar 106l may be removed from the model, so that the channel 210 closest to the pivot 312 may accept a long bar 106l and shorter and shorter vertical bars are placed in channels that are farther from the pivot. The outermost channels 210 may then preferably include short bars 106s. Additionally, several extra pairs of vertical bars 106 that are longer and/or shorter than those illustrated may be supplied in some aspects to allow for parabolic shapes with greater magnitudes of the coefficient a. In an aspect, the vertical bars 106 and/or the channels 210 may be color-coded to provide simple assembly of one or more types of parabola graphs. In other aspects, various text or symbol markings may serve similar purposes. For example, in an aspect, each length of vertical bar 106 may have a different color and the channels 210 may have one or more color markings that coincide with the vertical bar colors. In another aspect, instructions may be included to let students know how to quickly assemble parabolas with different a, b, and c values.

In another alternative aspect, vertical bars 106 may include markings or color coding along their length to represent different values of a, such that when properly assembled, a student could observe multiple parabolas (such as one up to a blue color and another up to a green color and another up to a red color and so on, for example) at a time. In one aspect, such color coding could even allow all vertical bars to be the same height. The user would then look at the color coding or other markings on the vertical bars, rather than the overall height of the bars to understand the parabola changes. An added advantage of having vertical bars of the same height is that the bars 106 could simply be flipped over to represent a change from positive to negative a values, or vice versa.

Figure 8:
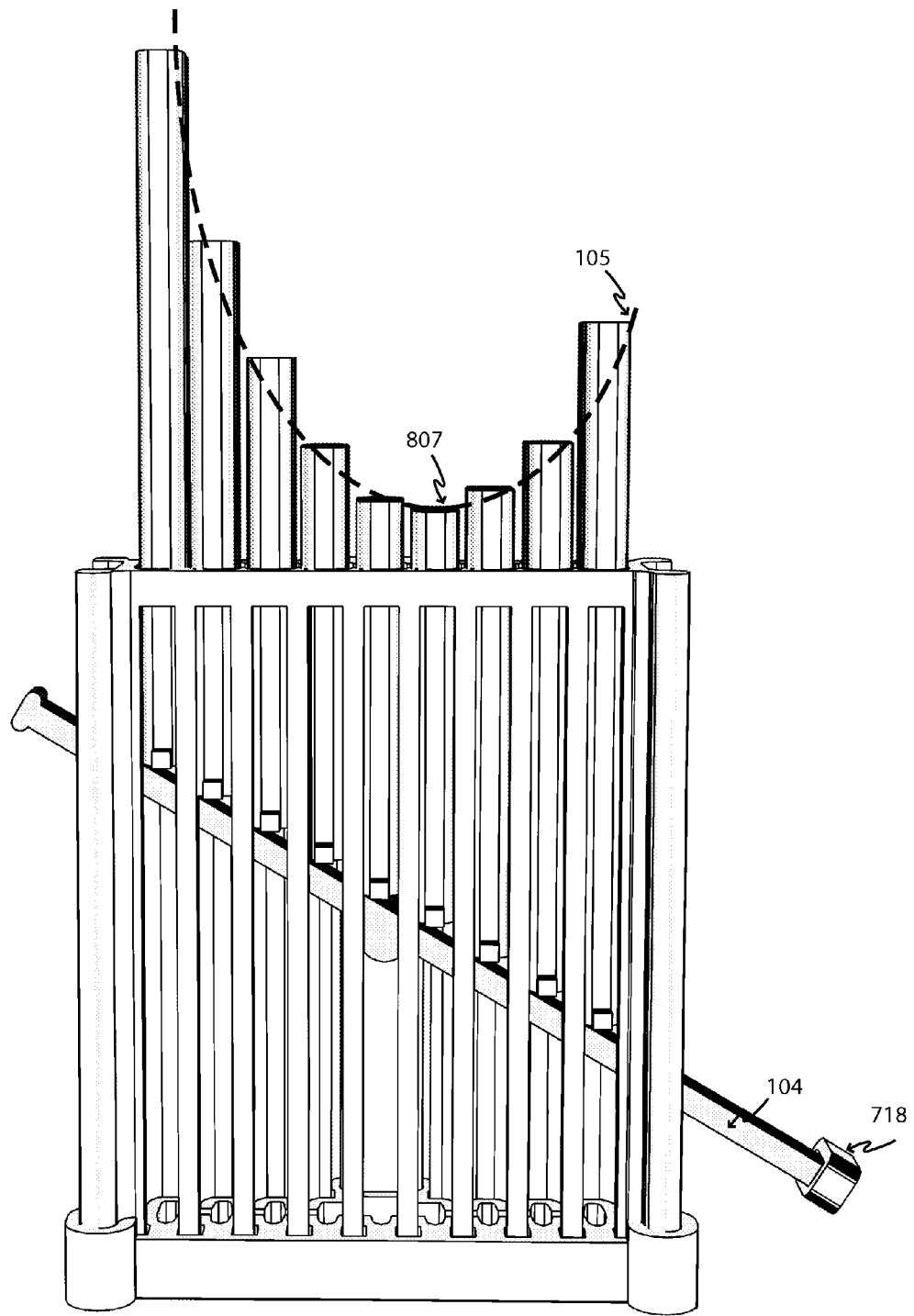
FIGS. 8 and 9 illustrate front views of the parabolic teaching aid of FIG. 1 in accordance with an embodiment of the present disclosure, where the lever has been shifted to a low point and a high point of travel.
Figure 9:
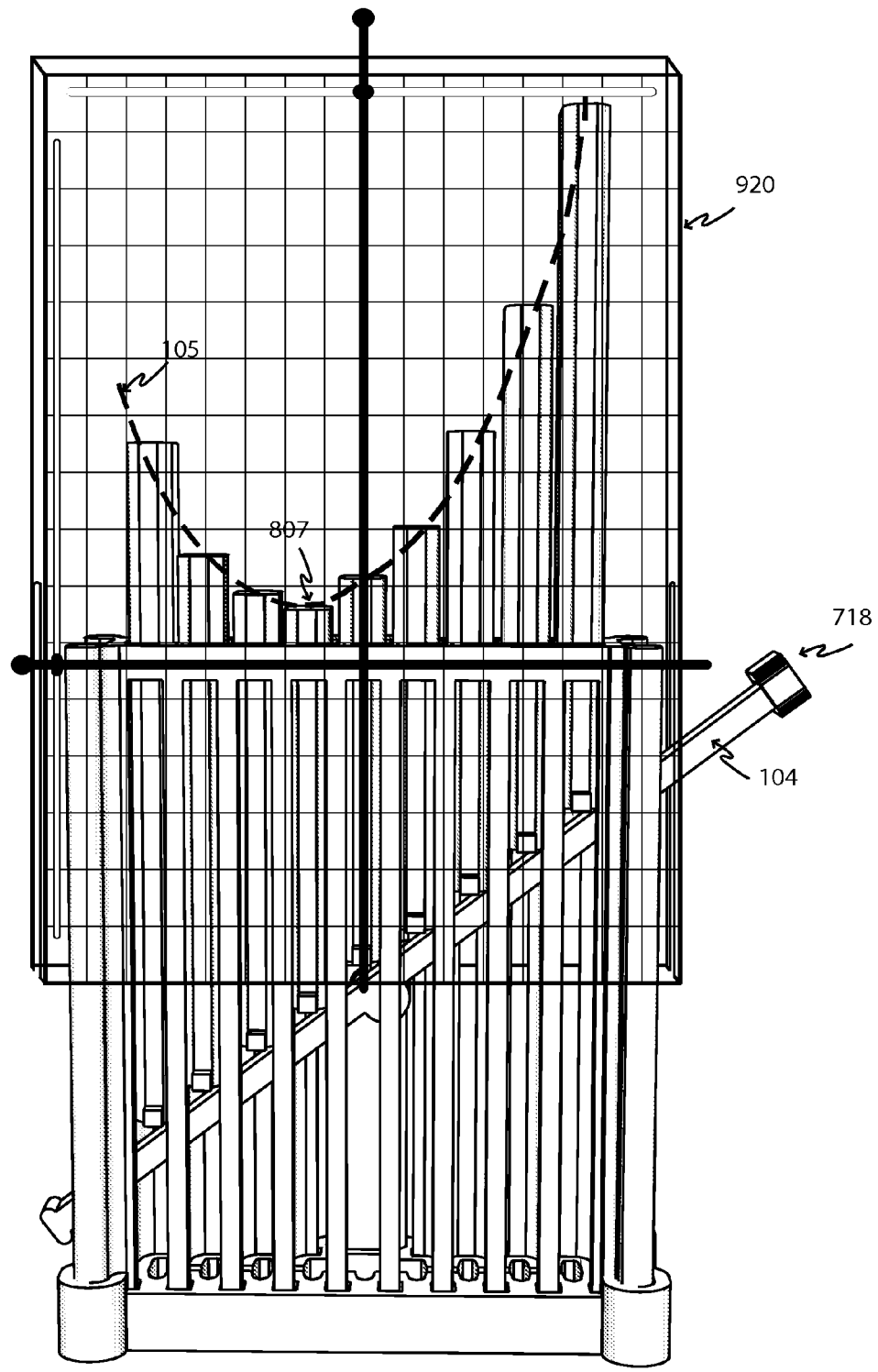

FIGS. 8 and 9 illustrate front views of the parabolic teaching aid of FIG. 1 in accordance with an embodiment of the present disclosure, where the lever has been shifted to a low point and a high point of travel. No particular angle is required or intended to be limiting in various aspects. In the example as illustrated, FIG. 8 shows the lever 104 (using handle 718 as a guide) moved downward to an angle of approximately 45° below horizontal, and FIG. 9 shows the lever 104 and handle 718 moved upward approximately 45° above horizontal. In general, the lever 104 can move smoothly between these two extremes. In various implementations, the lever may move between extremes that are greater or less than 45° while remaining within the spirit of the disclosure here. In FIG. 8, the vertex 807 of virtual parabola 105 can be seen to be shifted to the right of center. In FIG. 9, the vertex 807 of virtual parabola 105 can be seen to be shifted to the left of center.

In another aspect, pivot 312 may include a cog-like mechanism such that the lever "clicks" into one or more discreet settings, such as at parallel and at either extreme and/or angles in between. This may allow for easy study of visual representation of specific values of a, b, and c (standard equation) or h and k (vertex equation), in some aspects.

To assist in understanding the graphing of a parabola, a separate coordinate grid indicator (see indicator 920 in FIG. 9) may be provided in some aspects. In general, the coordinate grid indicator would illustrate the x- and y-axes and may illustrate gradations for positive and negative values. In an aspect, the coordinate grid indicator may include gridlines as well. In an aspect, the coordinate grid indicator may comprise a generally clear or at least partially transparent rigid plastic sheet with the x- and y-axes printed or etched into it. A coordinate grid indicator may attach to the front of base 102 in a fixed or movable manner in various aspects such that the vertical bars 106 can be seen through the grid indicator to illustrate various values for the modeled parabola in relation to the grid indicator. It will be understood that a wide variety of materials, and designs can be used to accomplish the purpose of the coordinate grid indicator. For example, in another aspect, the coordinate grid indicator may attach to the back of base 102 with the vertical bars 106 partially obscuring a user's view of the grid indicator. In such an embodiment, the grid indicator need not be transparent and could be made of an opaque material. Including a movable coordinate grid indictor can allow a simple representation of how changing the value of c in the standard equation affects the graphing of a parabola—it simply raises or lowers the parabola with respect to the x-axis. As discussed above, in an aspect where the pivot 312 is movable along a vertical channel 416, the same lesson can be taught with a fixed grid indicator.

With an example of the parabolic teaching aid now described, the manipulation of this teaching aid and its relation to understanding parabolas will be set forth in more detail. As described above, one of the simplest parabolas can be represented by the equation $y=x^2$. While many parabolic functions can be represented, the following description will use this simple equation as a representative example. In this case, for the standard and vertex equations, $a=1$ and $b=c=h=k=0$. The physical representation of a graph of this equation using the teaching aid described may be best illustrated in FIGS. 1, 2, and 4. In order to show this graph with the teaching aid, first the lever 104 is placed in the horizontal position. The center vertical bar 106 will be a short bar 106s, having a length that puts its top point at an imaginary $x=y=0$ coordinate. As described, this may be actually shown by positioning a grid coordinator indicating that the x- and y-axes cross at the point where the top of the short bar 106s rests. In another aspect, this may be represented by having a short bar 106s whose length puts its top generally at an equal height as the top of base 102. In an aspect, each set of outward channels 210 then may represent a gradation of 1 in the positive or negative x direction. As such, the channels 210 immediately next to the one that has accepted short bar 106s should accept vertical bars 106 that are longer than short bar 106s in order to represent a value of $y=1$ (because these channels would represent $x=-1$ and $x=1$). The next closest out channels 210, which represent $x=-2$ and $x=2$, would then accept vertical bars that are longer again and of a length to represent $y=4$. Similarly, the next closest out channels 210, which represent $x=-3$ and $x=3$, would then accept vertical bars that are longer again and of a length to represent $y=9$. The outermost channels 210 would then accept long bars 106l that represent $y=16$. Of course, this is a representative example only and other vertical bar lengths may be used to illustrate different functions, with higher or lower values of a. In one example, lower values of a can be illustrated by spacing the vertical bars farther apart, such as by skipping every other channel 210 or by using adjacent vertical bars 106 whose change in length varies more gradually. Conversely, larger values of a can be shown by using higher variances in adjacent vertical bar lengths or by skipping some bar lengths and moving the longest bars 106l to channels that are closer to the pivot 312 and leaving the channels farther out empty. Additionally, it should be noted that as long as the parabolic shape is maintained, the lengths of the vertical rods 106 may not strictly correspond to easily identified integer lengths on a coordinate system. Furthermore, negative values of a, which change the parabola to a downward shape can also be illustrated by reversing the lengths of the vertical rods to show a long rod 106l in a central channel, and shorter and shorter vertical rods being placed in the channels 210 out to short rods 106s, for example.

It should also be noted that values of h and k can also be varied by changing the initial setup of the teaching aid. For example, the point (h, k) represents the vertex of the parabola. For higher and lower values of h, the vertical bars 106 can be shifted to the left or the right in channels 210. Additionally, in some aspects a coordinate grid indicator may shift left or right. To change values of k, in some aspects a coordinate grid indicator may be raised or lowered and/or the pivot 312 may be raised or lowered when it is movable within a vertical channel 416.

More complex changes to the parabola can then be seen by raising and lowering the lever 104. Moving the lever from the horizontal starting position (as shown in FIGS. 8 and 9) maintains the same general curvature (i.e., the a value remains constant) of the parabola, but changes the value of b in the standard equation. Moving the lever also has the effect of shifting the vertex (h, k) along an unseen identical but inverted parabola. In other words, changing only the value of b has the effect of moving the position of the axis of symmetry left (positive b values) or right (negative b values), as well as moving the vertex, where the new vertex positions track the curve formed by an inverted version of the same parabola. The effect that the b coefficient has on the parabola may be most effectively visualized by the shifting sequence of parabola movements as the lever 104 is continuously moved by a user. In an aspect, a coordinate grid indicator may also have an indication of an inverted parabola that matches the parabola defined by the vertical rods, so that the user can watch the vertex trace the path of that parabola.

Figure 10:
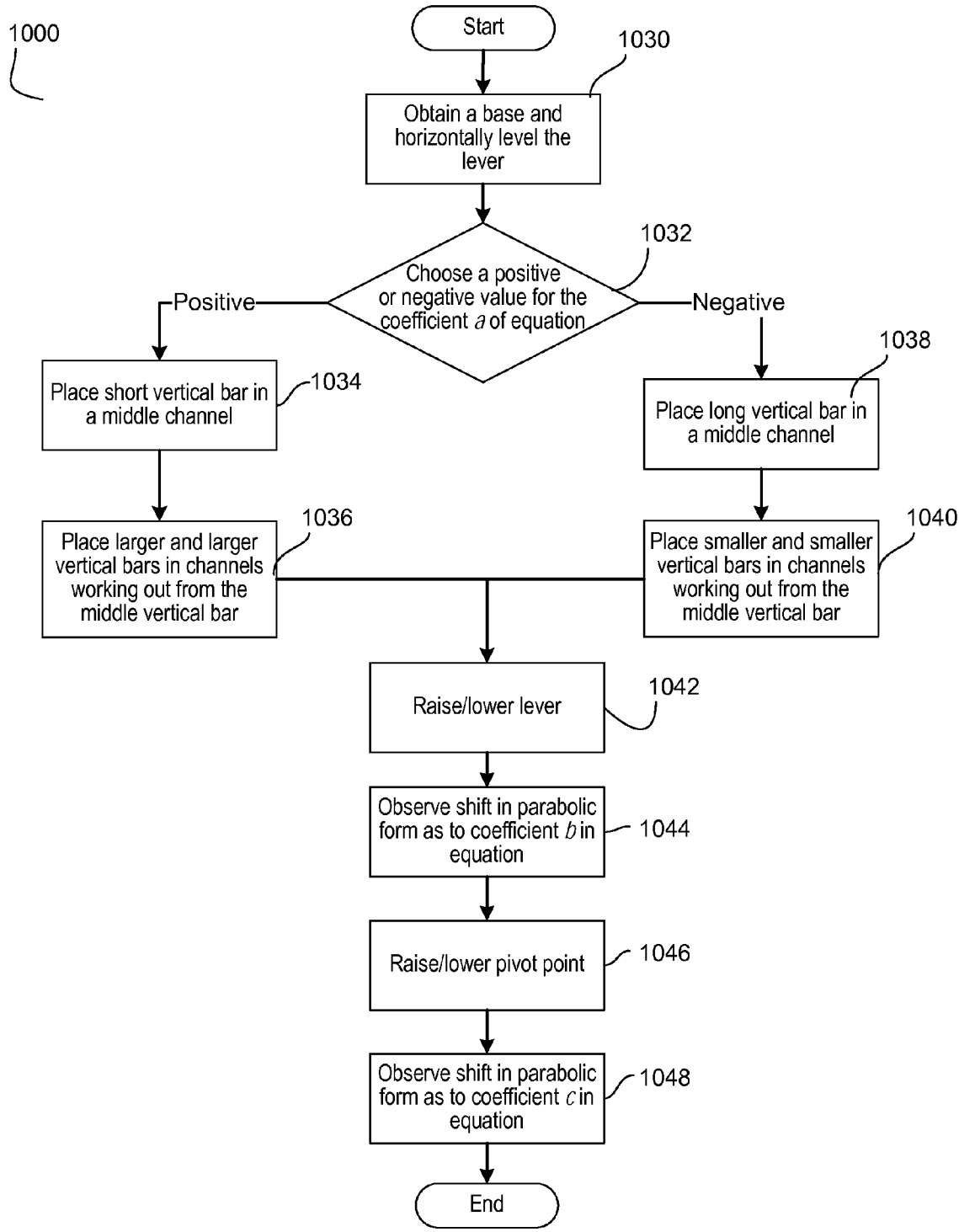
FIG. 10 illustrates an example method for learning about parabolic functions.

FIG. 10 illustrates one example method 1000 for learning about parabolas using a physical teaching aid as described herein. Many other methods for learning about parabolas may be used with the same physical teaching aid. Starting with block 1030, a student or other user obtains a base 102 having a lever 104 attached to it at a pivot 312, wherein the lever can hold a plurality of vertical bars 106 of varying lengths. At block 1032, the student chooses a value for the coefficient a of the standard equation. If the value is positive, the process continues to block 1034, where a short vertical bar 106s is placed in a central channel of the base 102. While this may be a middle channel of the base 102, such as to represent that the axis of symmetry is y=0, in an aspect, this need not be the case; the short vertical bar may be placed left or right of the center to represent other axes of symmetry. At block 1036, the user places larger and larger vertical bars in channels working out from the short vertical bar's position. As described above, a user may use instructions or color-coding or other coding to understand the placement of the bars in an aspect. In another aspect, the vertical bars may have numbers on them to indicate values, and a user may need to solve the parabolic equation with specific values, given by an instructor for example, to decide which vertical bars 106 should be placed in which channels.

Conversely, if a negative value of a is chosen, the process proceeds to block 1038 where a long vertical bar 106l is placed in a central channel of the base 102. Just as with respect to the positive values above, this may be a middle channel of the base 102, such as to represent that the axis of symmetry is y=0, but this need not be the case. At block 1040, the student places shorter and shorter vertical bars 106 in channels working out from the long vertical bar's position. As with block 1036, a user may use instructions or color-coding or other coding to understand the placement of the bars in an aspect. In another aspect, the vertical bars may have numbers on them to indicate values, and a user may need to solve the parabolic equation with specific values, given by an instructor for example, to decide which vertical bars 106 should be placed in which channels.

In either case, once the user has constructed their parabola in the teaching aid, at block 1042, the student can raise and lower the lever 104, which allows them to observe the shift in the parabola based on changes to the coefficient b in the standard equation at block 1044. Optionally, in an aspect, the student may also be able to raise and lower the pivot 312 at block 1046, which will allow the student to observe the shift in the parabola abased on changes to the coefficient c in the standard equation at block 1048 (raising the pivot point indicates an increase in the value of c). Alternatively, in an aspect with a movable coordinate grid indicator, moving the grid coordinator up and down can also illustrate changes to the coefficient c—although it will be noted that moving the coordinate grid indicator up with respect to the parabola of the vertical bars actually represents lessening the value of c.

Another advantage of the teaching aid as described herein is that the lever 104 and a coordinate grid indicator could also be manipulated to illustrate mathematical changes in linear formulas, y=ax+b, for younger or more remedial students or for comparison between linear and quadratic/parabolic equations.

Thus, methods and devices for mathematics learning have been described. Note that references throughout this specification to "one embodiment" or "an embodiment" or "one aspect" or "an aspect" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" (or similar uses of "aspect") in various portions of this specification are not necessarily all referring to the same embodiment. Furthermore, the particular features, structures or characteristics being referred to may be combined as suitable in one or more embodiments of the disclosure, as will be recognized by those of ordinary skill in the art. Additionally, alternatives other than those specifically described herein will be understood to fall within the scope of the teachings herein. For example, lever 104 may be replaced by a knob at the pivot to rotate a platform on which the vertical bars may rest. Alternatively, gears and a cranking mechanism may also supply the rotational movement suggested herein. While the present disclosure is described above with respect to what is currently considered its preferred embodiments, it is to be understood that the disclosure is not limited to that described above.

What is claimed is:

1. A device for teaching mathematics, comprising:
 a base having a plurality of channels for accepting vertical rods of varying lengths;
 a lever movably attached to the base at a pivot, the lever passing through the plurality of channels; and
 a plurality of vertical rods, each of the plurality of vertical rods located at least partially in one of the plurality of channels and resting on the lever;
 wherein the plurality of vertical rods are sized and arranged so that the tops of the vertical rods illustrate a parabolic function; and
 wherein moving the lever about the pivot moves the plurality of rods within the plurality of channels and illustrates changes to the parabolic function represented by the vertical rods.

2. The device of claim 1 wherein an equation representing the parabolic function can be written as $y=ax^2+bx+c$ and moving the lever about the pivot illustrates changes to a coefficient b from the equation.

3. The device of claim 2 further comprising a coordinate grid indicator attached to the base to provide a reference point for the parabolic function formed by the plurality of rods.

4. The device of claim 3 wherein the coordinate grid indicator is movably attached to the base and moving the coordinate grid indicator up or down illustrates changes to a coefficient c from the equation.

5. The device of claim 2 wherein the pivot is movable within a vertical slot of the base and moving a position of the pivot up or down within the vertical slot of the base illustrates changes to a coefficient c from the equation.

6. The device of claim 3 wherein the coordinate grid indicator is at least partially transparent.

7. The device of claim 6 wherein the coordinate grid indicator comprises x-axis and y-axis delineators.

8. The device of claim 6 wherein the coordinate grid indicator further comprises coordinate delineators.

9. The device of claim 1 wherein the vertical rods are removable from the base.

10. The device of claim 9 wherein the plurality of vertical rods comprises matching pairs of vertical rods, each pair having a given length that is different from other pairs.

11. The device of claim 10 wherein there are more vertical rods than channels and different subsets of the plurality of vertical rods can be used to illustrate changes in a coefficient a in an equation, $y=ax^2+bx+c$.

12. The device of claim 1 wherein the plurality of channels are equally spaced and correspond to equally-sized gradations along an x-axis of a coordinate grid; and wherein the plurality of vertical rods are sized proportionately to the gradations such that their differences in lengths reflect the parabolic function along a y-axis of the same coordinate grid.

13. A method for learning concepts of parabolas, comprising:
    obtaining a base having a plurality of channels to support vertical bars sitting on a rotatable platform;
    positioning vertical bars in the plurality of channels on the rotatable platform such that the vertical bars are sized to resemble a parabola;
    rotating the rotatable platform to observe changes to the parabola of the vertical bars, where the rotation indicates changes to a coefficient b in a standard parabolic equation, $y=ax^2+bx+c$.

14. The method of claim 13 wherein the rotatable platform can be raised or lowered within the base, the method further comprising:
    raising or lowering the rotatable platform to observe changes to the coefficient c in the standard parabolic equation.

15. A device for teaching mathematics, comprising:
    a base having a plurality of channels for accepting vertical rods;
    a rotatable platform movably attached to the base at a pivot, the platform passing through the plurality of channels for supporting vertical rods; and
    a plurality of vertical rods, each of the plurality of vertical rods located at least partially in one of the plurality of channels and resting on the rotatable platform;
    wherein the plurality of vertical rods are marked and arranged so that the markings of the vertical rods illustrate at least one parabolic function; and
    wherein rotating the platform about the pivot moves the plurality of rods within the plurality of channels and illustrates changes to the at least one parabolic function represented by the vertical rods.

16. The device of claim 15 wherein the markings of the vertical rods are color-codings.

17. The device of claim 15 wherein each vertical rod includes a second marking so that, taken together, the plurality of rods illustrate a second parabolic function, wherein the second parabolic function differs from the at least one parabolic function by a different value of a coefficient a, in a standard parabolic equation, $y=ax^2+bx+c$.

18. The device of claim 15 wherein the vertical rods are removable from the base; and wherein reversing each of the vertical rods within each rod's channel illustrates at least a second parabolic function, wherein the at least one parabolic function can be represented by at least a standard parabolic equation, $y=ax^2+bx+c$, and the at least a second parabolic function can be represented by at least a second parabolic equation, $y=-ax^2+b_2x+c_2$.

* * * * *